Dec. 20, 1966  W. H. MAGEARL ETAL  3,293,320
SPECIFIC GRAVITY ANALYZER AND CONTROL IN AN ALKYLATION PROCESS
Filed Aug. 15, 1963  3 Sheets-Sheet 1

CALIBRATION CURVE FOR SULFURIC ACID
CATALYZED ALKYLATION PROCESS

William Henry Magearl
Edison Charles Fanguy    INVENTORS
Ben Roumain Babin

BY *Reuben Miller*
          PATENT AGENT

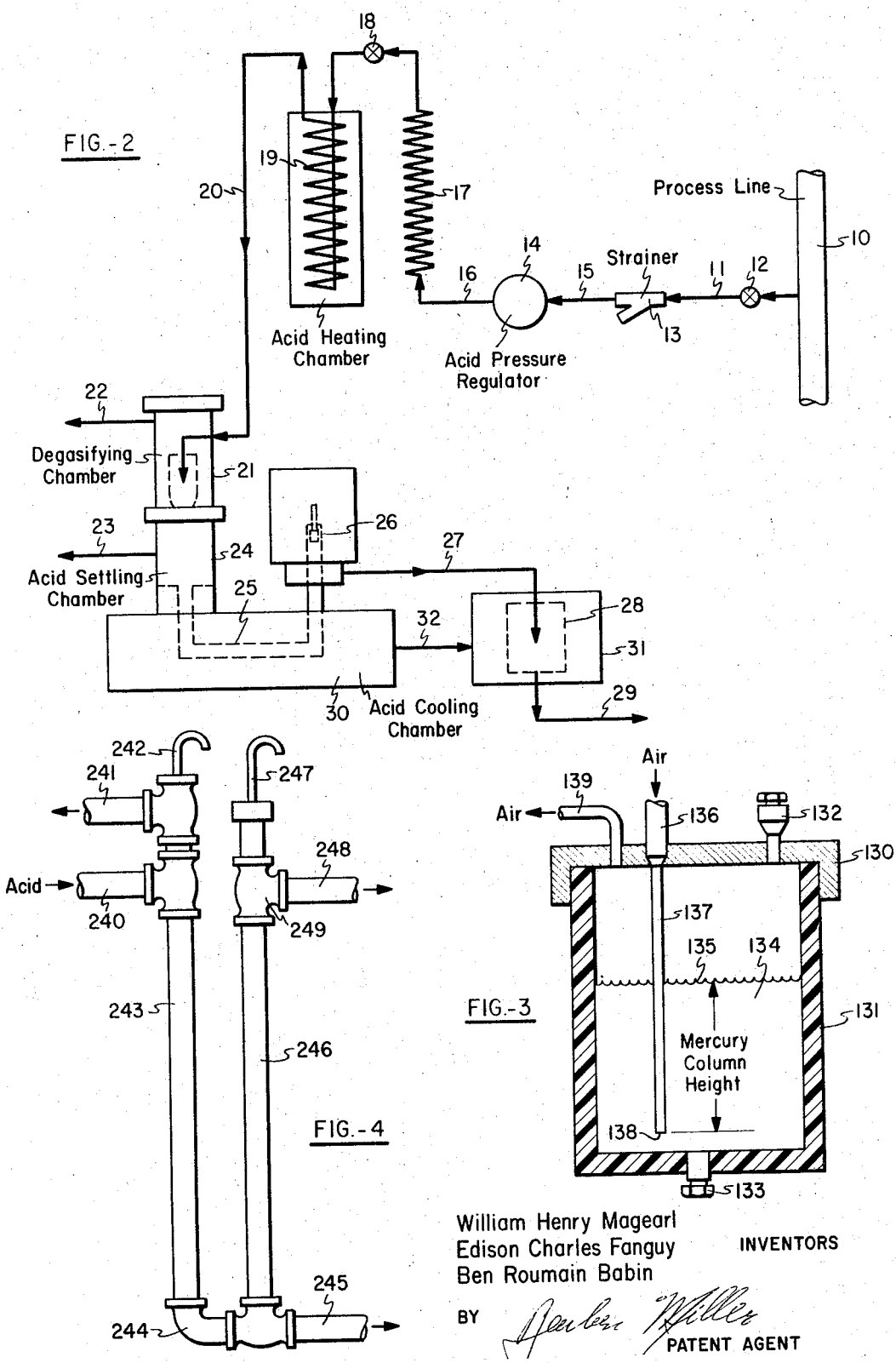

William Henry Magearl
Edison Charles Fanguy
Ben Roumain Babin
INVENTORS

BY
PATENT AGENT

United States Patent Office 3,293,320
Patented Dec. 20, 1966

3,293,320
SPECIFIC GRAVITY ANALYZER AND CONTROL IN AN ALKYLATION PROCESS
William Henry Magearl and Edison Charles Fanguy, Baton Rouge, and Ben Roumain Babin, Duplessis, La., assignors to Esso Research and Engineering Company, a corporation of Delaware
Filed Aug. 15, 1963, Ser. No. 302,285
10 Claims. (Cl. 260—683.59)

The present invention is concerned with a method and apparatus for the determination of the specific gravity of solutions. In particular the present invention is directed to the determination and control of acid strength in chemical processes dependent on acid catalysis by means of measuring the specific gravity. More particularly, the invention is directed to the determination and control of acid strength in a sulfuric acid catalyzed alkylation reaction in which an iso-paraffin and an olefin are reacted in contact with sulfuric acid by means of measuring the specific gravity of the acid by its differential pressure.

The importance of acid catalyzed reactions to the chemist is well recognized in the literature. General reactions falling within this broad category include saponification, hydrolysis, and the synthesis of esters and amides among others. See for instance Mechanism and Structure in Organic Chemistry by Edwin S. Gould (Holt and Company, N.Y., 1959) at page 110. Of particular interest to the petroleum refining art is the general category of acid catalyzed condensation reactions known as alkylation reactions. These reactions involve the addition of saturated hydrocarbons containing a tertiary carbon atom to a hydrocarbon having at least one olefinic function in the presence of an acid catalyst, e.g. a concentrated mineral acid such as sulfuric acid. The tertiary hydrocarbon constituents of the feed stock usually comprise isobutane, isopentane, and similar higher branched chain homologues containing at least one tertiary carbon atom per molecule. The olefinic reactants generally comprise propylene, normal butylenes, isobutylene, trimethyl ethylene, the isomeric pentenes and similar higher olefinic hydrocarbons of either a straight chain or branched chain structure. Mixtures of two or more of these mono-olefins may also be employed. Alkylation reactions involving acid catalysis are described in greater detail in U.S. Patents 2,256,615; 2,305,026; 2,322,482; 2,322,664 and many others. An improved alkylation process allowing the use of less concentrated mineral acide, e.g. sulfuric acid, is described in U.S. Patent 2,417,251.

In the alkylation of isoparaffins and olefins in the presence of mineral acids, e.g. sulfuric acid, of an alkylation strength, the mineral acid gradually becomes contaminated or fouled with carbonaceous matter such that it rapidly becomes relatively opaque. The buildup of carbonaceous material in the acid acts as a diluent and causes a drop in titratable acidity. Furthermore, water is also picked up from the hydrocarbon reactants and causes the acid to lose its strength. Taken together, the carbonaceous material and the water cause the acid to fall in titratable acidity and to lose gradually its ability to catalyze the alkylation reaction. The drop in titratable acidity may be due to either or both buildup of carbonaceous matter or absorption of water in the acid. It will be seen, therefore, that titratable acidity may not be a correct measure of the alkylation strength of the acid.

Since almost all commercial processes which utilize an acid catalyst involve continuous recycling of the acid catalyst through the reaction, it is of great importance to be able to continuously and accurately determine the acid strength. When the acid strength falls below the minimum amount necessary, additional fresh acid can be added. However, if the analytical technique is not accurate, then either too much acid may be added, resulting in a wasting of this expensive material, or else too little may be added, resulting in poor product yields.

One possible solution to this problem was advanced in U.S. Patent 2,765,218 by Emanuel M. Amir, wherein the acidity function of an alkylation acid, e.g. sulfuric acid, was determined spectrophotometrically. This technique, however, suffers from several disadvantages. In the first place, it requires the use of relatively expensive spectrophotometers. Secondly, it requires the continuous addition of an indicator compound such as alizarin blue. This compound must be added in known amounts so that a complicated and expensive control and metering system is necessary.

It is therefore an object of the present invention to provide a method and apparatus for the accurate and continuous determination of the specific gravity of reaction process streams. Another object of the present invention is to provide a method and apparatus for the accurate and continuous determination of acid strength in chemical processes employing acid catalysis by means of its specific gravity. A further object is to provide such a method and apparatus utilizing only relatively simple and inexpensive instruments and which will not require the addition of indicators or other reagents. It is a further object to provide a method and apparatus which can be adapted to provide automatic control over a continuous acid catalyzed chemical process so as to maintain maximum product yields with minimal acid losses.

It has now been found that the specific gravity and especially changes in the specific gravity of a process stream can be conveniently and continuously measured by means of determining the differential pressure exerted by a column of known height of a sample stream taken from the main process stream. By suitable calibration techniques it is possible to convert the column pressure into a direct measurement of the specific gravity of the column. Similarly, changes in the differential pressure can be converted directly into changes in the specific gravity of the sample stream. In this manner it is possible to follow and control chemical processes wherein the specific gravity of the process stream is a critical variable. Examples of such processes include acid and base catalyzed reactions, preparation of salt solutions of desired concentrations, etc.

In a preferred embodiment of the present invention, the differential pressure and thus the specific gravity of an $H_2SO_4$ catalyzed alkylation process stream is determined and is used as a direct measure of the acid strength. If desired, the process may be controlled by utilizing the specific gravity determination. When the acid strength and therefore the specific gravity falls to a pre-selected level, control equipment is activated and fresh acid is added to the process stream until the optimum level is reached. It is thus possible to utilize such a system to maintain the acid strength equilibrating about the optimum level thereby achieving a high process efficiency.

In utilizing the present invention in the determination of the acid strength of an acid catalyzed alkylation process, a continuous sample of the reaction process stream is directed, under the process pressure, to a separation zone. A constant pressure regulator is provided to maintain a constant rate of flow through a restriction coil to the heating chamber of the separation zone where the process sample is heated to the desired temperature, e.g. 142° F., by means of a temperature controlled hot water bath. The process sample then flows from the heating chamber to a stripping chamber where it is stripped of the hydrocarbon that may be present. The light hydrocarbons are vented to the atmosphere from the top of the stripping chamber as vapors, while the alkylate is skimmed off the acid and sent to the sewer as liquid alkylate. The stripped sample then flows, desirably by gravity, through the cooling chamber, which in a preferred embodiment, is a temperature controlled water bath. Since the specific gravity of a fluid is a function of its temperature, it is necessary that the measurement of the specific gravity be at a constant, known temperature in order that the results have any meaning. Obviously, an accurate temperature bath control system is critical to the proper functioning of the present invention. One desirable embodiment of a suitable temperature control system will be discussed later in this paper.

The stripped process stream, after being cooled to the desired test temperature, e.g. 95° F., then passes to a hydrometer well. A conventional hydrometer is used here to aid in the calibration of the analyzer system and also as an internal check on its accuracy. Following its passage through the hydrometer well, the sample stream flows to the differential pressure measuring section. This differential pressure measuring section is submerged in a constant temperature water bath which utilizes the temperature controlled water discharge from the conventional instrument cooling chamber water bath. The differential pressure measuring section consists of a U tube, which is easily made from materials readily on hand in a chemical process plant. When acid solutions are being measured, it is preferred that the U tube be made of stainless steel.

The sensitivity of the differential pressure measuring section will be directly dependent on the height of the arms of the U tube. In one preferred embodiment, where sulfuric acid strengths ranging between 85–95% are to be measured, the effective height of the arms of the U tube were 30".

In operation, the U tube receives the sample stream at the top of one arm and discharges to a disposal unit, e.g. a sewer, from the top of the other arm. At the bottom of the discharge side of the U tube there is connected the high pressure side of a commercially obtainable low range differential pressure pneumatic transmitter. To satisfy a change in specific gravity of 0.100 over a column length of 30", for exeample, the differential pressure pneumatic transmitter is calibrated to a range of 3" of water column. That is, if the acid in the sample stream were to initially have a specific gravity of 1.800 and then during the course of the process was to change to a specific gravity of 1.700, the difference in pressure would be equal to the height of the column times the change in the specific gravity or 30"×0.100. The result is a pressure change of 3" and this represents a full scale deflection in the differential pressure pneumatic transmitter.

Since the differential pressure pneumatic transmitter is not measuring from zero differential to 3" of water differential, but rather the change in differential caused by the change in specific gravity of a 30" column, some means of range elevation for the transmitter is required. This is accomplished by means of a mercury batch-air purged dipleg device. A stream of air is regulated by use of this device to provide a pneumatic output which is equivalent to 51" of water pressure as that established by the U tube which contains a fluid having a specific gravity of 1.700. The pneumatic output of this device is connected to the low pressure side of the differential pressure transmitter to effect the range elevation by providing a near canceling back pressure.

The pneumatic output of the differential pressure transmitter is connected to a pneumatic receiver recorder, where by use of a suitable calibration procedure readout may be obtained directly in specific gravity units, thus allowing direct and continuous measurement of this quantity. The recorder may be located at the testing site, or by use of pneumatic transmission lines, the readout can be remote, e.g. at the control room of the process plant.

Similarly, the pneumatic output of the differential pressure transmitter can be utilized to effect process control. The zero point can be fixed at the specific gravity equivalent to the optimum acid strength, which figure is obtained from a calibration curve such as shown in FIGURE 1. The pressure exerted by a 30" column (if the U tube is chosen with this dimension) of that selected specific gravity can then be easily determined. This pressure figure is then utilized in determining how high the mercury column in the range elevation device should be. That is, how high a column of mercury must you have in order to obtain the desired pressure. Therefore, when acid of the minimum specific gravity of 1.700 is in the U tube and the calculated column height of mercury is in the range elevation device, the differential pressure in the transmitter would be zero. If the specific gravity in the U tube were to change, then the pressure exerted by the acid column would change accordingly. The result would be a differential pressure in the transmitter. This differential pressure is transmitted as a pneumatic pulse which can activate valves controlling the fresh acid inlet to the process. It is well within the province of one skilled in the engineering art to utilize such a system to effect an increased or decreased acid flow based upon the pneumatic output of the differential pressure transmitter.

The present invention will be more clearly apparent by reference to the accompanying drawings:

FIGURE 2 depicts a schematic view of a flow sheet of the sampling, separation and testing sections of the system;

FIGURE 3 shows a vertical cross-sectional view of the range elevation device;

FIGURE 4 is a diagrammatic representation of the U tube section;

Figure 1:
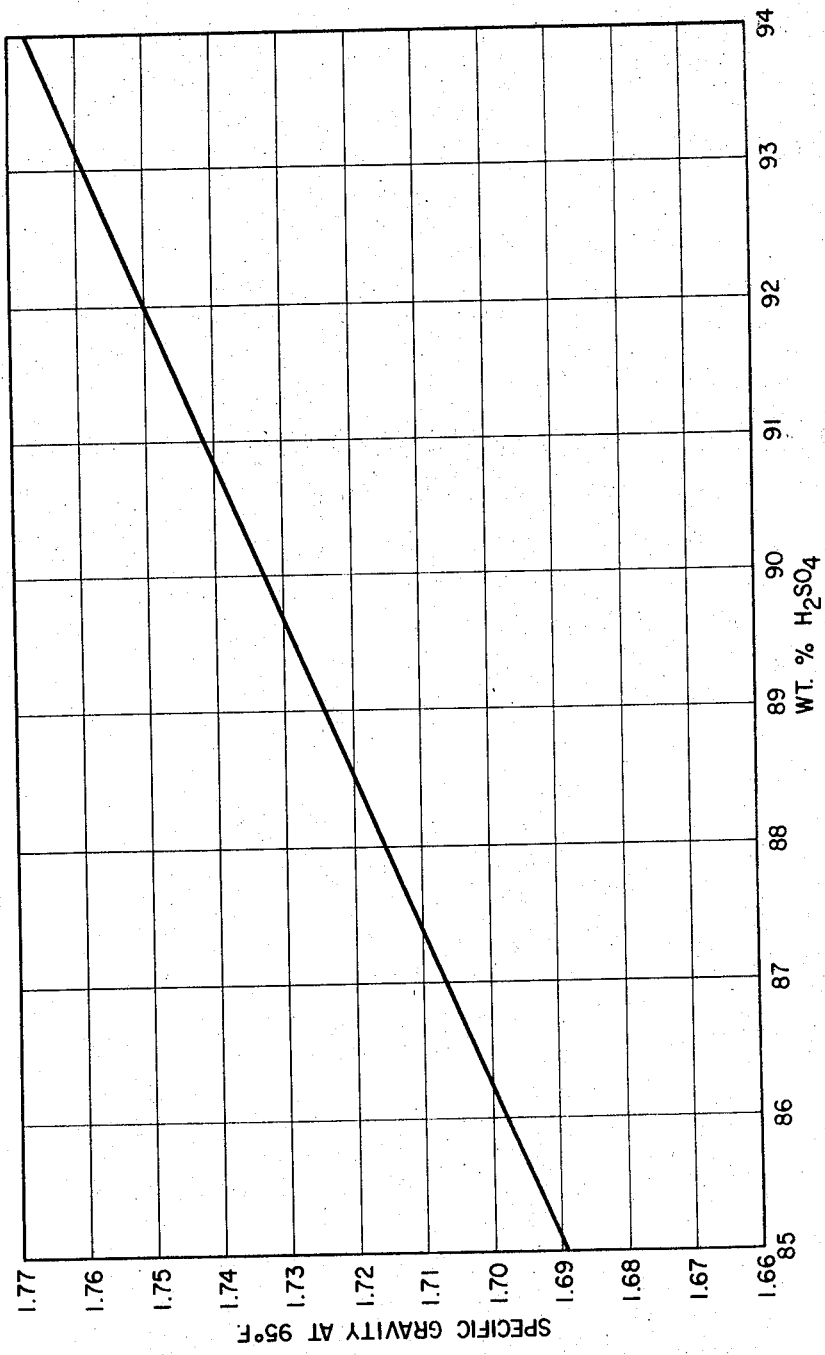
FIGURE 1 represents a calibration curve for a sulfuric acid catalyzed alkylation process.

Turning now to FIGURE 1, a calibration curve for a sulfuric acid catalyzed alkylation process is shown. The weight percent of the sulfuric acid (acid strength) is plotted along the abscissa and the specific gravity of the acid corresponding to the various concentrations is plotted along the ordinate axis. Measurements for this curve were taken at a temperature of 95° F. Thus, if an acid strength equivalent to 90 wt. percent sulfuric acid is desired, it would be necessary to maintain the acid stream at a specific gravity of about 1.7330. The pressure exerted by a 30" column of acid of specific gravity of 1.7330 would then be computed by a method known to the art. This figure would be used to compute the height of the column of mercury in the range elevation device necessary to give this pressure in order to use the system as a null point indicator to maintain a constant specific gravity value.

Similar calibration charts may be prepared for any process stream which is to be monitored. Samples of known concentration are passed through the system and the specific gravity measured by means of the hydrometer at a fixed temperature. Only a few fixed points at the extreme concentration limits and at selected intermediate points are necessary since the relationship between the specific gravity and the acid strength is practically linear within the range of 85–95 wt. percent sulfuric acid. If readout only is desired, the differential pressure may be directly standardized with the known concentration levels and specific gravity reading by using corresponding graphs with pressure plotted against specific gravity to yield readings directly in specific gravity units thus allowing the system to be used in determining unknown specific gravities.

Turning now to FIGURE 2, a schematic view of the sampling, separation and testing sections of the system of the present invention is shown. A sample is withdrawn from process line 10 by a sample line 11, the amount of sample flow being controlled by valve 12. The sample stream is strained by strainer 13 to remove any non-soluble particles. The sample is then led by lines 15 and 16 through pressure regulator 14 and coil 17 so as to provide a constant rate of sample flow. Sample flow is further controlled by means of valve 18. The sample stream is then heated by passage through heating chamber 19. In the case where a sample stream from a sulfuric acid catalyzed alkylation process is used, the preferred temperature that the acid is heated to is about 142° F. Heating can be accomplished by any suitable means known to the art such as hot water bath, steam bath, electric heater, etc. In a preferred embodiment, a hot water bath is used, the water coming from the temperature control system. The heated acid is then passed into the gasifying or stripping chamber 21 by means of line 20. In the stripping chamber, light hydrocarbons are vaporized and are removed from the system through vent line 22 to the atmosphere. The stripped chamber stream then flows into settling chamber 24 where the liquid alkylate layer is skimmed off and removed by line 23 for disposal. The recovered sample stream then flows through cooling chamber 30 by means of tubing 25. The temperature of the sample is lowered to about 95° F. in the case of the alkylation process previously described. The cooled sample stream then flows into hydrometer well 26. The hydrometer is available for continuous checking of the specific gravity of the sample stream by physical observation and further serves as an aid in the calibration of the device as previously indicated.

The sample stream at the constant temperature of 95° F. is next led into the differential pressure measuring section 28 by means of line 27. This section is maintained at the 95° F. temperature level by means of constant temperature bath 31 which is supplied with constant temperature water from cooling chamber 30 through insulated line 32. The spent acid, after being measured, is eliminated from the system by outlet line 29.

In operation, therefore, the system will continuously sample, separate, and measure the specific gravity of the process stream in question. Once the initial calibration has been made, the system is fully automatic and due to its simplicity of design requires only minimal maintenance.

Reference is now made to FIGURE 3 wherein a vertical cross-sectional view of the range elevation device is shown. The device is supported within vessel 131 which in a preferred embodiment is made of plexiglass thereby allowing direct vision to the interior. At the bottom of the vessel a mercury drain plug 133 is provided. The vessel is supplied with a slip-on cap 130, preferably made of steel. The cap is provided with mercury fill tap 132, air inlet 136 and air outlet or vent 139. In the operation of this device a quantity of mercury 134 sufficient to allow the desired low pressure to the pressure differential transmitter is introduced into the device through fill tap 132. When the air pressure in dipleg 137, which is attached to the air inlet, is equivalent to the pressure exerted by the column of mercury measured from mercury level 135 to the tip of the dipleg 138, air bubbles will be visible at the tip of the dipleg 138. The escaping air will pass out vent 139. In this manner any desired pressure may be obtained at the low pressure side of the differential pressure transmitter by merely adjusting the mercury level in vessel 131 and then correspondingly adjusting the air flow until the first bubbles appear at the dipleg tip 138.

Turning now to FIGURE 4, a diagrammatic representation of the U tube in the differential pressure measuring section is depicted. The sample stream is introduced through line 240 from the separation section. The stream flows down arm 243 of the U tube. This arm is equipped with vent 242 and outlet line 241 to remove any hydrocarbon vapor which might still have been retained by the stream and to remove excess flow, respectively. Junction 244 forms the base of the U tube and connects via line 245 to the high pressure side of the differential pressure transmitter. Junction 244 also connects with arm 246. This arm is also equipped with a vent 247. Junction 249 connects arm 246 with outlet line 248. In operation, the sample stream enters through the inlet arm and the resulting pressure due to the height of the column of the sample stream in arm 243 is hydraulically transmitted by line 245 to the high pressure side of the differential pressure transmitter. It should be understood that the height of the arms of the U tube may be selected arbitrarily. The limitations on the height are in the case of excessive length, its cost. On the other hand, the smaller the column height, the lower the sensitivity of the instrument. In the case of the alkylation process stream, a desirable height was found to be 30″ measured from the center of line 248 to the center of line 245.

Figure 5:
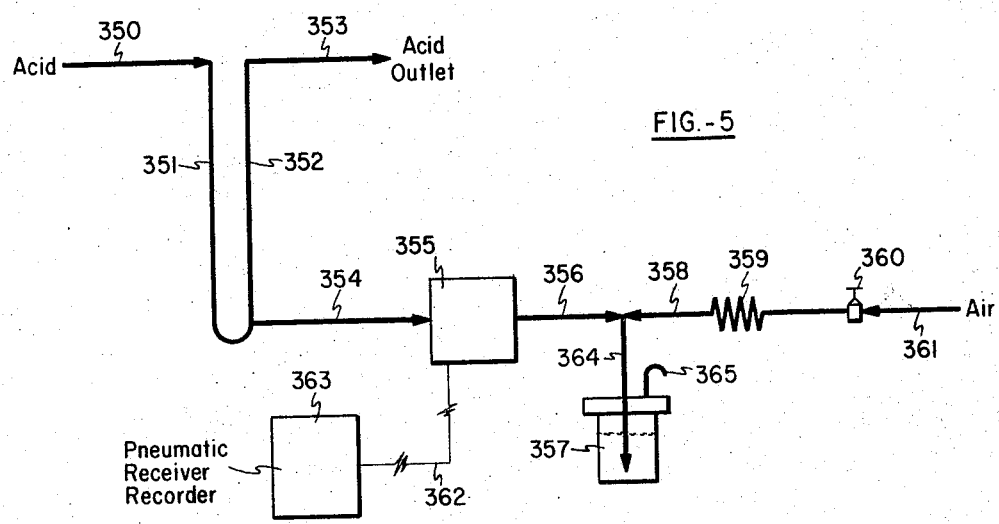
FIGURE 5 is a schematic view of the pneumatic transmission and recording sections.

In FIGURE 5 a schematic view of the pneumatic transmission and recording sections is depicted. The sample stream enters the section by means of line 350 and flows through the arms of the U tube 351 and 352. The sample overflow from arm 352 is removed by means of outlet line 353. The pressure developed in arms 351 and 352 by the sample column is hydraulically transmitted to the high pressure side of the differential pressure transmitter 355 by means of line 354. The back pressure needed to bring the differential pressure within the range of the transmitter is provided by the range elevation section. In this section a pressurized fluid such as air is provided from a source not shown to line 361. The flow of this fluid is regulated by regulator 360. The fluid then flows through line 358 and its flow rate is further modulated by means of capillary restriction coil 359 so as to allow fine control over the fluid flow. Line 356 communicated the pressure generated by the fluid to the low pressure side of differential pressure transmitter 355. Line 364 perpendicularly connects with line 356 and 358 and thereby allows a portion of the fluid to be diverted to mercury-containing vessel 357. This vessel contains a column of mercury having a height sufficient to yield the desired back pressure level. The flow of fluid is regulated by adjusting regulator 360 to the point that an occasional air bubble is seen to escape from line 364 through the mercury. At this point the fluid pressure in line 356 is known to be equivalent to the pressure exerted by the selected mercury column height. For example, in the case where an alkylation sample stream is being tested, the stream has a specific gravity in the range between 1.7 and 1.8, a column of mercury having a height of about 3.75″ is necessary in order to provide sufficient back pressure to a differential pressure transmitter having a range of 3″ differential water pressure.

The resultant pressure between the high pressure and low pressure sides of differential transmitter 355 is numerically transmitted in a conventional manner by means of line 362 to a pneumatic receiver recorder 363 of a type well known in the art. As indicated previously, this recorder may be located at a considerable distance from the sampling area. Additionally, the pneumatic impulse transmitted by line 362 may be utilized to control the acid inlet to the process stream.

Figure 6:
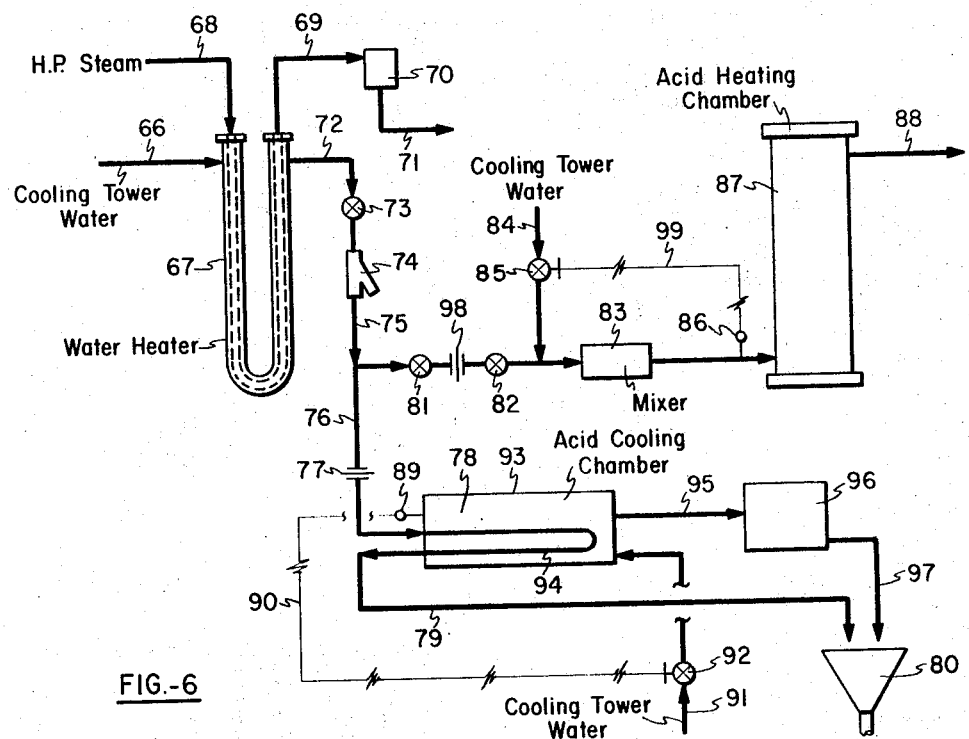
FIGURE 6 depicts the temperature control system in a schematic representation.

Turning now to FIGURE 6, a schematic representation of the temperature control system of the present invention is shown. Cold water from a source not shown is introduced into the system by means of line 66. High pressure stream similarly introduced from a source not shown is introduced by line 68 and the two streams are intimately contacted in water heater 67. Spent steam is removed through line 69, trap 70 and outlet line 71.

The resultant hot water is carried by line 72 through control valve 73 to strainer 74 where foreign particulate matter is withdrawn. The strained hot water flows through line 75 and control valve 81 to restriction orifice 98 where the water flow rate is modulated so as to yield a relatively constant flow of hot water. The modulated water then enters mixer 83 via control valve 82. In like manner, cold water from source not shown enters mixer 83 by means of line 84 and automatic control valve 85. The resulting water is then utilized in heating chamber 87 to raise the temperature of the sample stream and then is eliminated by outlet line 88. The water temperature is maintained at a relatively uniform value by means of temperature recorder control 86 which controls the flow of cold water into mixer 83 by means of control line 99 to valve 85. For instance, in a preferred embodiment, the desired temperature in the heating chamber is 142° F. If the water entering the heating chamber is of a higher temperature, the temperature recorder control 86 is activated and opens valve 85 so as to increase the concentration of cold water in mixer 83 until the desired temperature is reached. If, on the other hand, the temperature becomes too low, valve 85 is closed.

A portion of the hot water from line 75 is shunted off by line 76. The flow of this shunted water is modulated by passing it through restriction orifice 77 to yield a relatively uniform flow rate. The hot water then flows into cooling chamber 93 through coils 94. The water is discharged through line 79. Cold water is introduced from a source not shown into line 91. This water flows through control valve 92 into the cavity 78 of cooling chamber 93. A temperature recorder control 89 is utilized to maintain the temperature in cooling chamber 93 at a uniform preset value, e.g. 95° F. This device operates in the same manner as temperature recorder control 86. That is, if the temperature in the cooling chamber exceeds the desired value, control 89 by means of line 90 opens valve 92 so as to increase the flow of cold water. If the temperature becomes too low, the reverse action occurs. Overflow water at the desired constant temperature is carried by means of insulated line 95 to differential pressure measuring section 96. Exhaust water from this section is removed through line 97 to sewer 80. Thus, all sections of the system are maintained at desired temperature levels by utilizing controlled flow rates of hot and cold water.

While the present invention has been described specifically for the purposes of continuously measuring the specific gravity of a process stream, the system of the present invention may also be adapted to the measurement of the specific gravity of individual samples. This may be accomplished by filling the U tube with the unknown sample and then adjusting the back pressure provided by the range elevation device until no differential pressure exerts in the transmitter. By measuring the height of mercury needed to effect this pressure equalization, one skilled in the art may readily compute the specific gravity of the unknown sample.

Still other uses of the present invention may make themselves evident to one skilled in the art through the disclosures contained herein. Also, it is possible to effect changes in the apparatus described without departing from the spirit of this invention.

What is claimed is:

1. A system for the determination of the specific gravity of fluid samples comprising in combination:
   (A) a U tube having samples stream inlet means, sample stream outlet means and fluid pressure transmitting means, said fluid pressure transmitting being located at the base section of said U tube;
   (B) range elevation means adapted to provide a fluid stream of selectable pressure which comprises fluid transport means containing a pressurized fluid stream control means operatively connected to said fluid transport means, said control means being adapted so as to regulate the pressure of said fluid stream, pressure sensing means operatively connected to said fluid transport means and adapted to receive a small portion of said pressurized fluid stream and further adapted to sense the attaining of a selected pressure level in the said fluid stream, whereby the pressure of said fluid stream is regulated by said control means until the selected pressure level is sensed by said pressure sensing means;
   (C) differential pressure transmitting means having a high pressure side and a low pressure side, said high pressure side being adapted to receive the fluid pressure generated by said fluid sample in said U tube through said fluid pressure transmitting means, and said low pressure side being adapted to receive the pressure exerted by said fluid stream from said range elevation means, whereby a differential pressure is generated within said differential pressure transmitting means;
   (D) recording means adapted to receive said diffential pressure from said differential pressure transmitting means, said recording means being calibrated so as to convert said differential pressure into specific gravity units;
   (E) temperature control means whereby the temperature of the system is maintained at a constant, selected temperature level.

2. The system of claim 1 wherein said pressure sensing means comprises in combination:
   (A) a vessel having a top, a bottom, restraining walls and an internal cavity;
   (B) a pool of relatively dense, inert fluid having a known specific gravity contained within said internal cavity;
   (C) pressurized fluid stream inlet means adapted to receive said small portion of said fluid stream and further adapted to communicate with and extend some distance into said pool;
   (D) dense fluid inlet and outlet means communicating with said internal cavity so as to allow adjustment of the dense, inert fluid pool level to any selectable height above said pressurized fluid stream inlet means by the addition or removal of dense fluid;
   (E) pressurized fluid stream outlet means communicating with said internal cavity;
wherein the pressure of said pressurized fluid stream can be determined at the point where it is equivalent to the determinable pressure exerted by the pool of dense fluid of known specific gravity as evidenced by the emergence of the pressurized fluid stream from the pressurized fluid stream inlet means.

3. A system for the continuous determination of the specific gravity of a process stream comprising in combination:
   (A) process stream sampling means adapted to provide a continuous sample stream;
   (B) sample stream purification means;
   (C) a U tube having sample stream inelt means, sample stream outlet means and fluid pressure transmitting means, said sample stream inlet means being adapted to receive said sample stream from said sample stream purification means and said fluid pressure transmitting means being located at the base section of said U tube;
   (D) range elevation means adapted to provide a fluid stream of selectable pressure which comprises a pressurized air stream transport means, control means operatively connected to said pressurized air stream transport means, said control means being adapted so as to regulate the pressure of said air stream, pressure sensing means operatively connected to said pressurized air stream transport means and adapted to receive a small portion of said pressurized air stream and further adapted to sense the attaining of a selected pressure level in said fluid stream, whereby the pressure of said air stream is regulated by said control means until the selected pressure level is sensed by said pressure sensing means;

(E) differential pressure transmitting means having a high pressure side and a low pressure side, said high pressure side being adapted to receive the fluid pressure generated by said fluid sample in said U tube through said fluid pressure transmitting means and said low pressure side being adapted to receive the pressure exterted by said fluid stream from said range eleveation means, whereby a differential pressure is generated within said differential pressure transmitting means;

(F) recording means adapted to receive said differential pressure from said differential pressure transmitting means, said recording means being calibrated so as to convert said differential pressure into specific gravity units;

(G) temperature control means whereby the temperature of the system is maintained at a constant, selected temperature level.

4. The system of claim 3 wherein said range elevation means comprises in combination;

(A) a pressurized air stream transport means;
(B) control means operatively connected to said pressurized air stream transport means, said control means being adapted so as to regulate the pressure of said air stream;
(C) pressure sensing means operatively connected to said pressurized air stream transport means and adapted to receive a small portion of said pressurized air stream and further adapted to sense the attaining of a selected pressure level in said fluid stream;

whereby the pressure of said air stream is regulated by said control means until the selected pressure level is sensed by said pressure sensing means.

5. The system of claim 4 wherein said pressure sensing means comprises in combination:

(A) a vessel having a top, a bottom, restraining walls and an internal cavity;
(B) a pool of mercury contained within said internal cavity;
(C) pressurized air stream inlet means adapted to receive said small portion of said air stream and further adapted to communicate with and extend some distance into said mercury pool;
(D) mercury inlet and outlet means communicating with said internal cavity so as to allow adjustment of the mercury pool level to any selectable height above said air stream inlet means by the addition or removal of mercury;
(E) air stream outlet means communicating with said internal cavity;

wherein the pressure of said pressurized air stream can be determined at the point where it is equivalent to the determinable pressure exerted by the mercury pool as evidenced by the emergence of the pressurized air stream from the pressurized air stream inlet means.

6. The system of claim 5 wherein process control means are adapted to receive and be activated by said differential pressure from said differential pressure transmitting means.

7. A method for the continuous determination and control of the specific gravity of process stream comprising the following steps:

(A) diverting a portion of said process stream so as to form a sample stream;
(B) passing said sample stream through a column of known height at a known and constant temperature;
(C) taking the differential pressure of the pressure exerted by said sample stream in said column and the pressure exerted by a fluid stream of known and selectable pressure;
(D) utilizing said differential pressure to activate process control means.

8. The method of claim 7 wherein the pressure of said fluid stream is adjusted to the desired pressure level by passing a portion of said fluid stream into a mercury pool and thereafter regulating the flow rate of the total said fluid stream until said portion of said fluid stream displaces a column of mercury of desired height.

9. A method for the continuous determination and control of the specific gravity of the acid stream in an acid catalyzed alkylation process comprising the following steps:

(A) diverting a portion of the alkylation process stream so as to form a sample stream;
(B) heating said sample stream;
(C) stripping said heated sample stream of light hydrocarbons and skimming off liquid alkylate;
(D) cooling and then maintaining said sample stream at a desired testing temperautre;
(E) passing said sample stream through a column of known height at said testing temperature;
(F) taking the differential pressure of the pressure exerted by said sample stream in said column and the pressure exerted by an air stream of known and selectable pressure wherein said air stream is adjusted to the desired pressure level by passing a portion of said air stream into a mercury pool and thereafter regulating the flow rate of the total air stream until said portion of said air stream displaces a column of mercury of desired height;
(G) utilizing said differential pressure to control acid flow into said alkylation process stream.

10. The method of claim 9 wherein said alkylation process in sulfuric acid catalyzed, said sample stream is heated to about 142° F., said sample stream is cooled and maintained at a temperature of about 95° F., said sample stream is passed through a column of 30″ in height and a column of about 3.75″ of mercury is displaced by said air stream whereby the specific gravity of said acid stream is maintained near its optimum value.

References Cited by the Examiner

UNITED STATES PATENTS

| 1,888,577 | 11/1932 | Stephens et al. | 73—438 |
| 2,211,748 | 8/1940 | Devenish | 73—438 |
| 2,592,063 | 4/1952 | Persyn | 23—253 |
| 2,821,857 | 2/1958 | Basilevsky | 73—438 |
| 2,850,552 | 9/1958 | Ogle | 260—683.43 |
| 2,952,157 | 9/1960 | Hayden et al. | 73—438 |
| 3,190,126 | 6/1965 | Wright | 73—438 |

DELBERT E. GANTZ, *Primary Examiner.*

ALPHONSO D. SULLIVAN, *Examiner.*

C. R. DAVIS, *Assistant Examiner.*